United States Patent [19]
Pernstich et al.

[11] Patent Number: 5,771,623
[45] Date of Patent: Jun. 30, 1998

[54] TELESCOPIC SIGHT

[75] Inventors: Ludwig Pernstich, Innsbruck; Konrad Seil, Schwaz; Dietmar Menges, Innsbruck, all of Austria

[73] Assignee: Swarovski Optik KG, Absam, Austria

[21] Appl. No.: 550,666

[22] Filed: Oct. 31, 1995

[30] Foreign Application Priority Data

Oct. 31, 1994 [DE] Germany ............... 44 38 955.8

[51] Int. Cl.⁶ ..................................... F41G 1/38
[52] U.S. Cl. .................. 42/101; 42/103; 33/246; 356/303
[58] Field of Search .............. 42/103, 101; 356/5.01, 356/3.03, 3.04, 3.05; 33/245, 246

[56] References Cited

U.S. PATENT DOCUMENTS

| | | | |
|---|---|---|---|
| 4,395,096 | 7/1983 | Gibson | 33/245 |
| 5,052,801 | 10/1991 | Downes, Jr. et al. | 33/241 |
| 5,092,670 | 3/1992 | Preston | 352/140 |
| 5,291,263 | 3/1994 | Kong | 356/152 |
| 5,339,720 | 8/1994 | Pellarin et al. | 359/403 |
| 5,528,354 | 6/1996 | Uwira | 356/5.01 |

FOREIGN PATENT DOCUMENTS 32 08 814  4/1985  Germany.
42 18 118  12/1993  Germany.

Primary Examiner—Stephen M. Johnson
Attorney, Agent, or Firm—Fay, Sharpe, Beall, Fagan, Minnich & McKee

[57] ABSTRACT

A telescopic sight for firearms has a laser rangefinder for the target with a laser transmitter and a laser receiver. Since the beam path of the laser transmitter and the beam path of the laser receiver are brought into the visual telescopic sight beam path, the telescopic sight objective is simultaneously the objective for the laser transmitter and the laser receiver. For adjusting the reticle on the point of impact an optical member movable relative to the weapon is provided between the reticle and the light entrance side of the telescopic sight.

21 Claims, 4 Drawing Sheets

TELESCOPIC SIGHT

BACKGROUND OF THE INVENTION

This invention relates to a telescopic sight in particular for hand-held firearms.

To permit the point of aim to be matched with the point of impact in particular after the telescopic sight is mounted on the gun, the reticle is generally disposed in known telescopic sights in the focal plane of the objective and the eyepiece, mounted movably relative to the main tube of the telescopic sight and adjustable with two adjusting spindles disposed perpendicular to each other (cf. DE 32 08 814 C2).

However, even when the telescopic sight is adjusted the point of aim and point of impact coincide only at the distance on which the gun is registered due to the trajectory of the projectile. At a shorter distance than the registration distance the point of impact is above the point of aim and at a greater distance below it.

The hunter or other user usually knows, to a degree sufficient for practice, the ballistic performance of the weapon and the projectile used and thus the amount of deviation between point of impact and point of aim in accordance with the amount of deviation between the actual shooting distance and the registration distance. However, it often causes considerable difficulties in particular on strange, unaccustomed terrain to estimate the actual distance of the target with sufficient accuracy. Incorrect ratings more than twice too high or low are not unusual.

For exact rangefinding one therefore already uses laser rangefinders for hunting (company pamphlet "Laser Rangefinder RF1, Swarovski Optik K. G.). Laser rangefinders are based on the principle of measuring the travel time of a laser pulse or laser pulse sequence emitted by the laser transmitter. The laser pulse or pulse sequence is reflected by the target aimed at. Part of this reflected light hits the laser receiver. The resulting reception signal ends the travel time measurement. One half of this time, divided by the constant speed of light, yields the distance of the target aimed at.

Currently used laser rangefinders have separate beam paths with separate objectives for the laser transmitter and the laser receiver. They are therefore voluminous and heavy. It is also impractical to have to aim at the target twice before shooting, once with the reticle of the laser rangefinder to determine the shooting distance, and then with the reticle of the telescopic sight.

The same disadvantages are found in the laser rangefinder disposed in a housing outside the telescopic sight in DE 42 18 118 A1.

The invention is therefore based on the problem of providing a telescopic sight with an integrated laser rangefinder.

This is obtained according to the invention in that the telescopic sight objective is simultaneously the objective for the laser transmitter and the laser receiver since the beam path of the laser transmitter and the beam path of the laser receiver are brought into the visual telescopic sight beam path, and the device for adjusting the reticle on the point of impact has an optical member movable relative to the weapon between the reticle and the light entrance side of the telescopic sight.

SUMMARY OF THE INVENTION

According to the invention the beam path of the laser transmitter and the beam path of the laser receiver are brought into the visual beam path of the telescopic sight. The telescopic sight objective is thus simultaneously the objective for the laser transmitter and the laser receiver. This attains a compact, weight-saving integration of the laser rangefinder in the telescopic sight.

The line of sight of the telescopic sight and the optical axis of the laser rangefinder integrated therein must coincide exactly, so that the laser rangefinder measures the distance of the target aimed at with the reticle of the telescopic sight and not of an object adjacent to the target. On the other hand, the beam path of the laser transmitter and the laser receiver is brought into the beam path of the telescopic sight between objective and reticle of the telescopic sight. That is, if one adjusted the reticle on the point of impact when registering the gun by moving the reticle, as in known telescopic sights, this would only adjust the line of sight on the target but not the optical axis of the laser rangefinder, so that the laser rangefinder would not measure the distance of the target aimed at but of an object adjacent to it.

To prevent this, the device for adjusting the reticle on the point of impact has according to the invention an optical member movable relative to the weapon and disposed between the reticle and the light entrance side of the telescopic sight.

This optical member movable relative to the weapon in the adjusting device is preferably formed by at least one partial lens of the objective, but can also be the entire objective. For moving the partial lens or entire objective one can provide two adjusting spindles disposed perpendicular to each other.

It is also possible to form the objective member movable relative to the weapon as a disk which has base surfaces extending on a slant to-each other, is rotatable around the optical axis of the objective and cooperates with a complementary disk. When the reticle is adjusted on the point of impact during registration of the weapon, motion of the objective or objective member thus jointly adjusts the visual beam path of the telescopic sight and the beam path of the laser rangefinder.

In the inventive telescopic sight the reticle is thus preferably rigid relative to the outer tube, i.e. fixed on the gun, in contrast to most conventional telescopic sights.

For bringing the beam path of the laser transmitter and the beam path of the laser receiver into the visual telescopic sight beam path, a reflection surface selectively reflecting the laser light is disposed in the visual telescopic sight beam path in each case. The reflection surface can be formed by a mirror or by a prism.

For laser light selective reflection the reflection surface can have a coating which reflects long-wave laser light with a wavelength of e.g. approx. 0.9 microns but passes visible light.

The beam path of the laser transmitter and the beam path of the laser receiver can be brought into the visual telescopic sight beam path coaxially. The two reflection surfaces for the laser transmitter and laser receiver are then disposed one behind the other in the optical axis of the objective. If the reflection surface for the laser transmitter is disposed on the objective side and the reflection surface for the laser receiver on the reticle side, the laser receiver forms a ray cone coaxial to the optical axis of the objective and disposed in the coaxial ray cone envelope of the laser receiver.

Instead of coaxially disposing the visual beam path, the beam path of the laser transmitter and the beam path of the laser receiver, it is also possible to reflect the beam path of the laser transmitter e.g. into one, for example the lower, half of the visual telescopic sight beam path, and the beam path of the laser receiver into the other, for example upper, half of the visual telescopic sight beam path.

The inventive telescopic sight further preferably has a digital display for the distance of the target measured by the laser rangefinder, which is reflected into the visual telescopic sight beam path. For this purpose a reflection surface is disposed in the visual telescopic sight beam path, preferably between the reticle on the one hand and the two reflection surfaces for the laser transmitter and receiver on the other hand.

So that the digital or other optical distance display impairs the view through the telescopic sight as little as possible, the optical display can emit light in the long-wave range of visible light, e.g. of more than 0.65 microns, and the reflection surface in the visual telescopic sight beam path have, for reflecting in the optical display, a coating which reflects light of this wavelength, i.e. of 0.65 microns and more, but passes visible light with a shorter wavelength, i.e. a wavelength less than 0.65 microns. Instead the optical distance display can also be reflected into the visual telescopic sight beam path with a reflection surface semitransparent for visible light, whereby the optical display can then also emit light with a wavelength of the entire visible range, e.g. white light, although this can result in a slight loss of brightness.

To simplify the mounting of the inventive telescopic sight, one preferably provides a component carrier which is inserted into the outer tube of the telescopic sight. Apart from the objective and the adjusting device, practically all other components of the telescopic sight can be fastened to the component carrier, e.g. the laser transmitter and the laser receiver with the entire optics for reflecting the laser transmitter and laser receiver into the visual telescopic sight beam path, the entire control and evaluation electronics of the laser rangefinder, the optical distance display with the optics for reflecting the optical distance display into the visual beam path of the telescopic sight, as well as the reticle and the eyepiece of the telescopic sight. This has the great advantage that all adjustments and checks can be done before the objective is mounted.

For the control and evaluation electronics of the laser rangefinder one preferably provides boards which are disposed around the component carrier. For this purpose the component carrier preferably has a rectangular, in particular square, cross section or another prismatic cross section, for example a hexagonal cross section, the boards being disposed on the outside surfaces of the prismatic component carrier.

To receive the reticle, the erecting system and the eyepiece of the telescopic sight the component carrier preferably has a coaxial inside bore or a duct.

To match the point of impact with the point of aim in accordance with the target distance measured by the rangefinder, it is known to adjust the reticle via a ballistics computer with a servomotor. In the embodiment of claim 7 each of the two perpendicular adjusting spindles can e.g. therefore be operated with such a servomotor. So that the ballistic data of the weapon and the ammunition enter into the control of the adjusting device through the one or more servomotors, an electronic memory storable with these data is provided, as well as a computer which links the signals of the evaluation electronics of the laser rangefinder with the stored data.

BRIEF DESCRIPTION OF THE DRAWINGS

In the following an embodiment of the inventive telescopic sight will be explained more closely with reference to the drawing, in which.

DESCRIPTION OF THE PREFERRED EMBODIMENTS

Figure 2A:
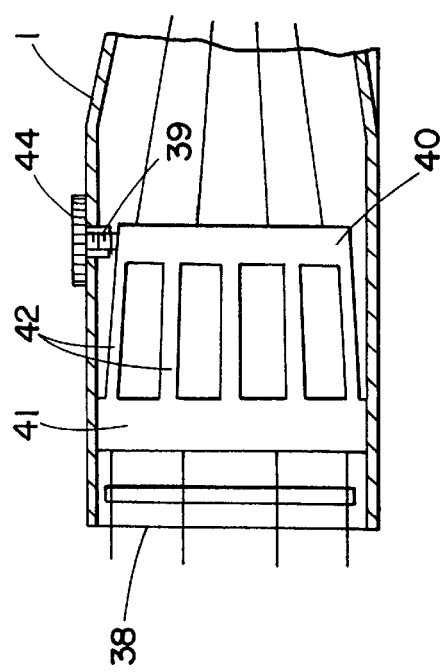
FIG. 2a shows a variant of the device for adjusting the reticle.
Figure 2:
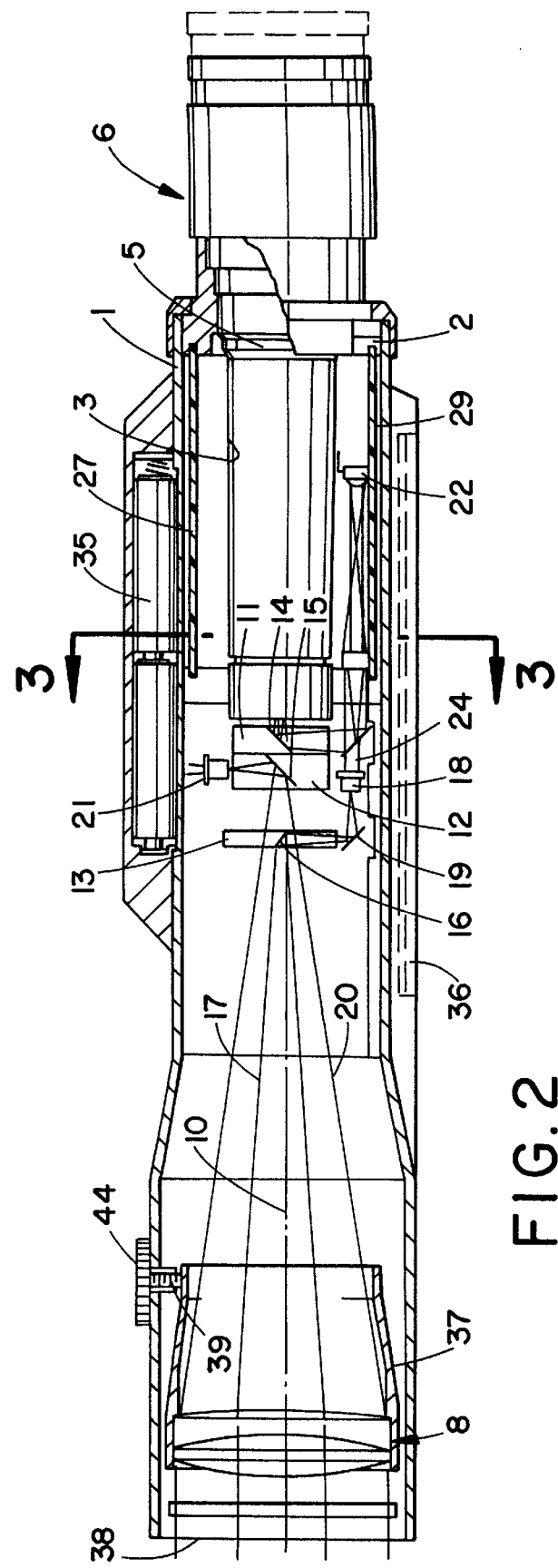
FIG. 2 shows a partly longitudinal-section view of the telescopic sight of FIG. 1.
Figure 3:
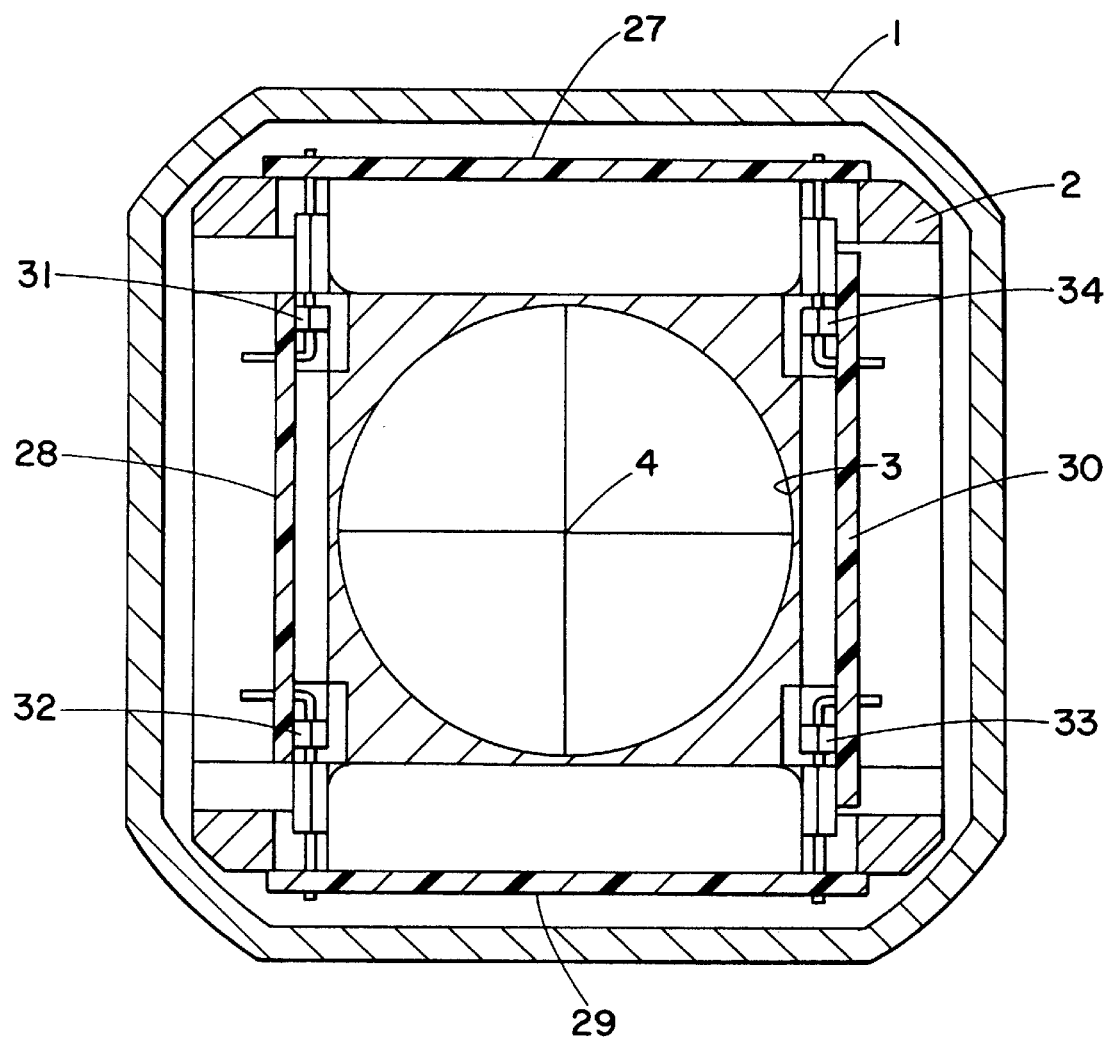
FIG. 3 shows a cross section along line III—III in FIG. 2, omitting the parts mounted on the outside of the outer tube.

According to FIGS. 2 and 3 the telescopic sight has outer tube 1 in which component carrier 2 is disposed. Component carrier 2 contains coaxial duct 3 with reticle 4 formed as a hair cross. Duct 3 further contains the erecting system of the telescopic sight.

Reticle 4 and the erecting system are preferably disposed in inner tube 5 inserted in duct 3. Inner tube 5 joins up with eyepiece 6. The erecting system can be designed for constant or variable enlargement.

Figure 4:
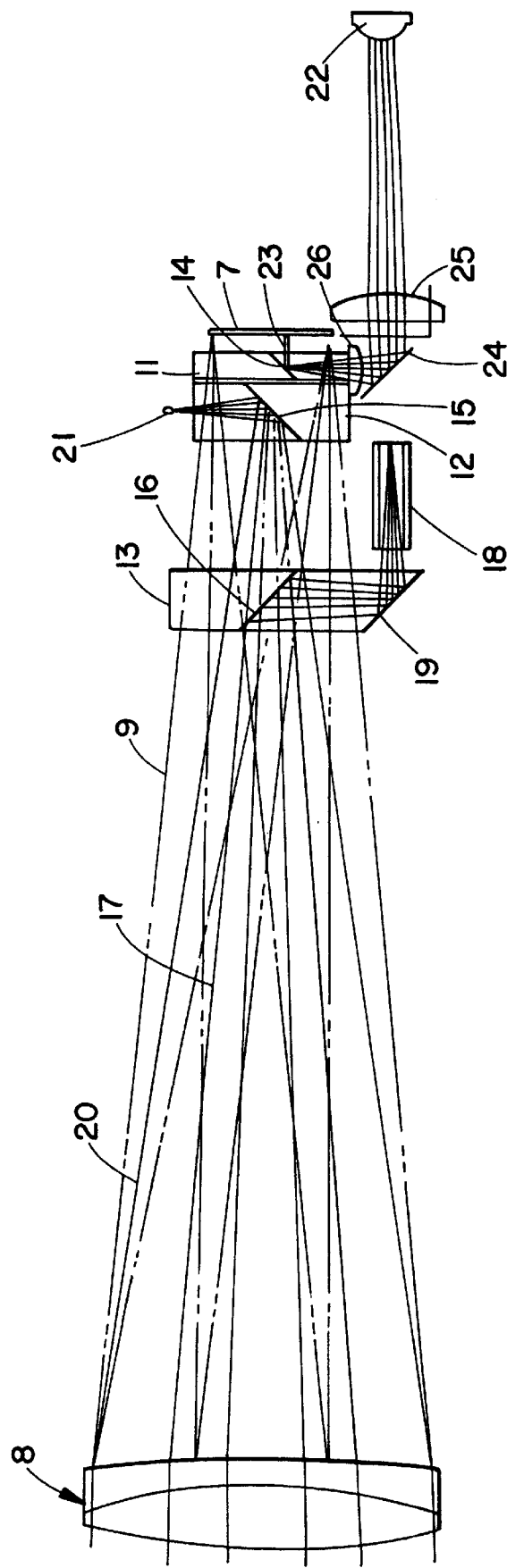
FIG. 4 shows a view of the visual telescopic sight beam path in the viewing direction from the reticle as well as of the beam path of the laser transmitter and the laser receiver of the laser rangefinder and the beam path of the optical distance display.

Reticle 4 is disposed in focal plane 7 of objective 8 (FIG. 4).

The optical axis of the visual telescopic sight beam path is designated ashy. Between the radial plane with reticle 4 and objective 8 three beam splitters 11 to 13 each formed as a prism and having reflection surface 14 to 16 are provided one behind the other in the viewing direction of the telescopic sight in the visual telescopic sight beam path, i.e. ray beam 9 of objective 8. Beam splitters 11 to 13 can also be formed by mirrors.

Beam splitter 13 with reflection surface 16 serves to reflect beam path 17 of laser transmitter 18 into visual telescopic sight beam path 9 toward objective S. For this purpose transmitter 18 is fastened on one side, the lower side in the drawing, to component carrier 2 on the reticle side of reflection surface 16, the optical axis of transmitter 18 extending parallel to optical axis 10 of the telescopic sight. Through mirror 19, a prism or similar optical deflecting or auxiliary device the laser beam emitted by transmitter 18 is reflected to reflection surface 16 of beam splitter 13. Transmitter 18 is formed by a transmitter diode.

Beam splitter 12 with reflection surface 15 serves to reflect beam path 20 of the aimed at, target-reflected radiation (not shown) received via objective 8 to laser receiver 21. Receiver 21 is therefore aligned perpendicular to optical axis 10 and fastened to component carrier 2 on the side opposite transmitter 18, the upper side in the drawing. Receiver 21 is formed by a photodiode.

Reflection surfaces 15 and 16 of beam splitters 12 and 13 are disposed so that beam paths 17 and 20 of transmitter 18 and receiver 21 extend coaxially to optical axis 10 of the telescopic sight. Objective 8 is thus at the same time the objective for laser transmitter 18 and laser receiver 21.

Since reflection surface 16 of laser transmitter 18 is disposed before reflection surface 15 for laser receiver 21 in the viewing direction-of the telescopic sight, beam path 17 of transmitter 18 forms a ray cone coaxial to optical axis 10 and surrounded by the coaxial ray cone envelope of beam path 20 of laser receiver 21.

So that reflection surfaces 15 and 16 of beam splitters 12 and 13 of the laser rangefinder do not shade off the telescopic sight in this area, they are provided with a dichroic coating which causes only the long-wave laser light of e.g. approx. 0.9 microns with degree of reflection R of approx. 100% to be reflected, while reflection surfaces 15 and 16 are permeable for visible light, i.e. preferably have degree of transmission T of approx. 100% for visible light.

Beam splitter 11 with reflection surface 14 serves to reflect distance display 22, preferably designed as a digital display, into the visual telescopic sight beam path toward eyepiece 6.

As apparent in particular from FIG. 4, reflected-in beam path 23 of optical display 22 extends parallel to optical display 10 of the telescopic sight, being shifted downward in the drawing so that optical display 22 does not impair the view of the middle area of reticle 4.

Optical distance display 22 is fastened to component carrier 2 on the side to which beam path 23 is shifted, i.e. on the lower side in the drawing.

Mirror 24 or similar optical erecting or auxiliary device diverts the light emitted by distance display 22 to reflection surface 14, imaging lenses 25, 26 being disposed as further optical auxiliary devices between distance display 22 and mirror 24 and between mirror 24 and reflection surface 14, respectively.

Optical distance display 22 emits light in the long-wave range of visible light, i.e. with a wavelength e.g. more than 0.65 microns. Reflect-on surface 14 is therefore formed by a dichroic coating so that it partially reflects the long-wave light of distance display 22 e.g. with a degree of reflection of 50% and has a degree of transmission of approx. 100% for visible light with a wavelength of less than 0.65 microns.

The focal plane of beam path 23 of distance display 22 is in the plane of reticle 4, i.e. focal plane 7 of objective 8.

As apparent from FIG. 3, component carrier 2 has a square cross section. Boards 27 to 30 are fastened to the outside surfaces of component carrier 2. plug-in connections 31 to 34 are provided for connecting boards 27 to 30.

Board 27 is the base board. Board 28 has the control electronics for laser transmitter 18, board 29 the control electronics for laser receiver 21 and board 30 the evaluation electronics of the laser rangefinder. Boards 27–29 provide memory locations in which ballistic data of the weapon and ammunition are storable.

The source of energy is formed by batteries 35 or corresponding accumulators which are disposed on outer tube 1. Further, mounting rail 36 is provided on the underside of outer tube 1 for fastening the telescopic sight to the gun not shown.

After the telescopic sight is mounted on the gun the point of impact must be matched with the point of aim for the registration distance. For this purpose an adjusting apparatus is provided for adjusting reticle 4 or the line of sight on the point of impact. This adjusting device has according to the invention an optical member movable relative to the gun between reticle 4 and light entrance side 38 of the telescopic sight.

According to FIG. 2 this optical member is formed by entire objective 8 which is disposed in inner tube 37 mounted on the light entrance side of outer tube 1 with a joint not shown in the drawing. Two adjusting spindles disposed perpendicular to each other act on inner tube 37 at a space from the joint, whereby FIG. 2 shows only one adjusting spindle 39. Inner tube 37 is spring-loaded against the adjusting spindles e.g. by two springs not shown.

FIG. 2a shows a variant of the adjusting device. A partial lens of objective 8 is disposed for example in ring-shaped cage 40 before, in the viewing direction, the other lenses of the objective which are located in ring 41 attached to outer tube 1. Cage 40 is connected with ring 41 via spring pins 42. Adjusting spindle 39 and the adjusting spindle perpendicular thereto (not shown) act on cage 40.

Figure 1:
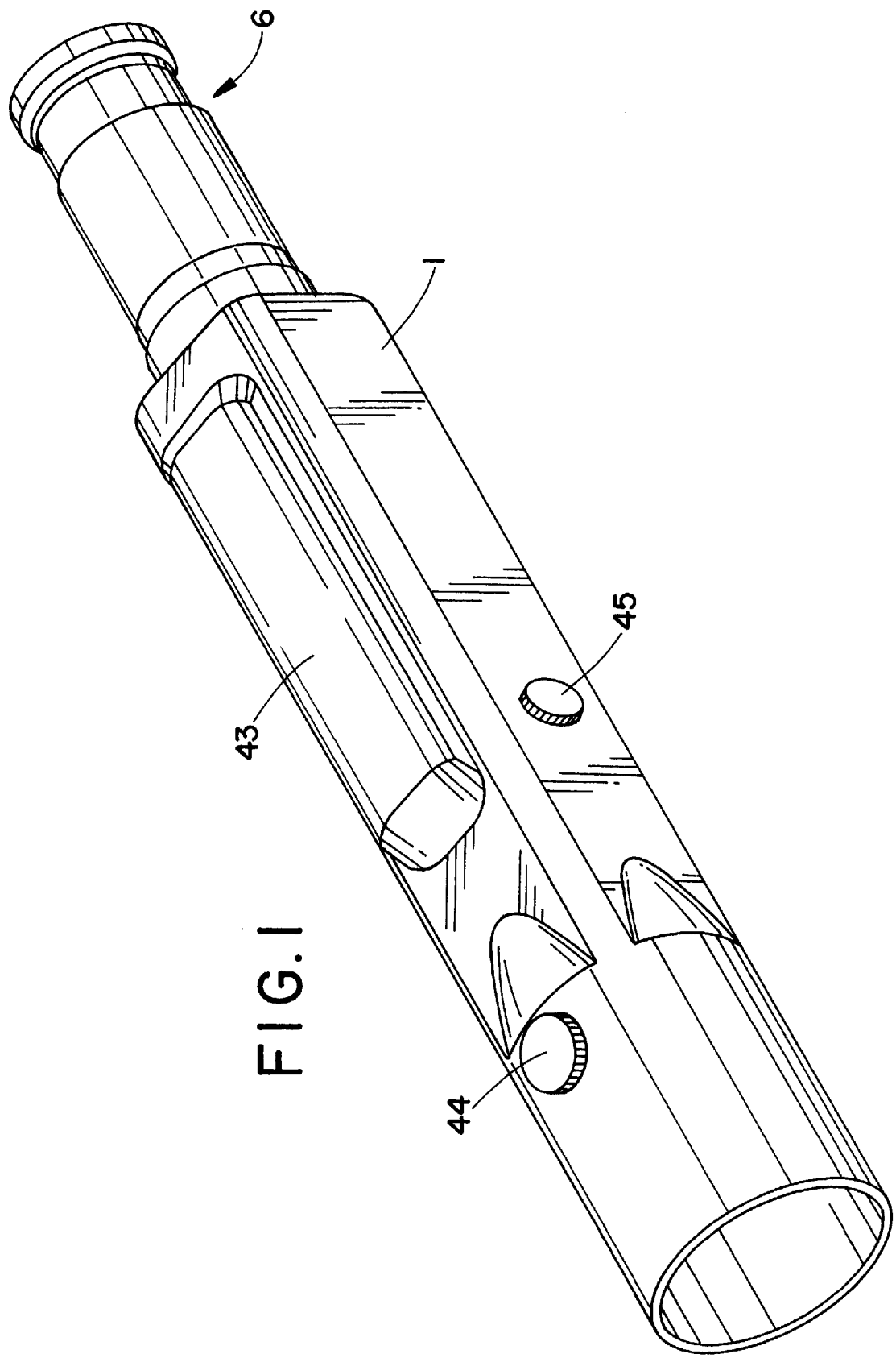
FIG. 1 shows a perspective view of the telescopic sight.

According to FIG. 1 outside housing 1, apart from the widened cylindrical portion receiving objective 8, is of rectangular shape in accordance with component carrier 2. The power source is located under covering 43. While adjusting button 44 for threaded spindle 39 is to be seen in FIG. 1, the adjusting button for the adjusting spindle perpendicular thereto is hidden. With push-button 45, which is preferably mounted on the left side of outer tube 1, the marksman can operate the laser rangefinder, including optical distance display 22, e.g. with the thumb of the left hand. While designation 44 represents adjusting button as shown in FIGS. 1, 2 and 2a the corresponding locations on the present device designated by 44 represent a servomotor 44' for adjusting the reticle 4. The servomotor 44' being controllable by the evaluation of electronics of the laser rangefinder and the ballistic data stored in the memory on at least one of boards 27–29.

We claim:

1. A telescopic sight for firearms comprising:
a reticle (4), a device for adjusting the reticle on a point of impact and a laser rangefinder for the target with a laser transmitter (18) and a laser receiver (21), wherein a telescopic sight objective (8) is simultaneously the objective for the laser transmitter (18) and the laser receiver (21) since the beam path (17) of the laser transmitter (18) and the beam path (20) of the laser receiver (21) are brought into a visual telescopic sight beam path (9), and the device for adjusting the reticle (4) on the point of impact including an optical member movable relative to the firearm between the reticle (4) and the light entrance side (38) of the telescopic sight.

2. The telescopic sight of claim 1, wherein the beam path (17) of the laser transmitter (18) and the beam path (20) of the laser receiver (21) are brought into the visual telescopic sight beam path (9) between the objective (8) and the reticle (4).

3. The telescopic sight of claim 2, wherein for bringing the beam path (17) of the laser transmitter (18) and the beam path (20) of the laser receiver (21) into the visual telescopic sight beam path (9), the telescopic sight further includes a reflection surface (15, 16) selectively reflecting the light and passing visible light is disposed in the visual telescopic sight beam path (9) in each case.

4. The telescopic sight of claim 1, wherein for bringing the beam path (17) of the laser transmitter (18) and the beam path (20) of the laser receiver (21) into the visual telescopic sight beam path (9) the telescopic sight further includes a reflection surface (15, 16) selectively reflecting the light and passing visible light is disposed in the visual telescopic sight beam path (9) in each case.

5. The telescopic sight of claim 4, wherein the two reflection surfaces (15, 16) are disposed one behind the other in the visual telescopic sight beam path (9).

6. The telescopic sight of claim 4, wherein the beam path (17) of the laser transmitter (18) and the beam path (20) of the laser receiver (21) are brought into the visual telescopic sight beam path (9) coaxially.

7. The telescopic sight of claim 1, wherein the beam path (17) of the laser transmitter (18) and the beam path (20) of the laser receiver (21) are brought into the visual telescopic sight beam path (9) coaxially.

8. The telescopic sight of claim 7, wherein two reflection surfaces (15, 16) are disposed one behind the other in the visual telescopic sight beam path (9).

9. The telescopic sight of claim 1, wherein the optical member of the adjusting device movable relative to the firearm is formed to include at least one partial lens of the objective (8).

10. The telescopic sight of claim 9, further including two adjusting spindles (39) disposed at an angle to each others, provided for moving the at least one partial lens of the objective (8).

11. The telescopic sight of claim 10, further including a component carrier (2) disposed in an outer tube (1) of the telescopic sight provided for holding in place the laser transmitter (18) and laser receiver (21), control and evaluation electronics of the laser rangefinder as well as an erecting system and an eyepiece (6) of the telescopic sight.

12. The telescopic sight of claim 1, further including an optical distance display (22) connected to evaluation electronics of the laser rangefinder and adapted to be brought into the visual telescopic sight beam path (9).

13. The telescopic sight of claim 12 wherein the optical distance display (22) emits light in the long-wave of visible light, and a reflection surface (14) selectively reflecting the light of the optical distance display (22) is provided for bringing the optical distance display (22) into the visual telescopic sight beam path (9).

14. The telescopic sight of claim 13, further including a component carrier (2) disposed in an outer tube (1) of the telescopic sight provided for receiving the laser transmitter (18) and laser receiver (21), control and evaluation electronics of the laser rangefinder as well as an erecting system and an eyepiece (6) of the telescopic sight.

15. The telescopic sight of claim 14, further including a memory, disposed on boards (27–29), provided in which the ballistic data of the weapon and the ammunition are storable, and the device for adjusting the reticle (4) is operable by at least one servomotor (44') which is controllable by the evaluation electronics of the laser rangefinder and the ballistic data stored in the memory.

16. The telescopic sight of claim 1, further including a component carrier (2) disposed in an outer tube (1) of the telescopic sight provided for holding in place the laser transmitter (18) and laser receiver (21), control and evaluation electronics of the laser rangefinder as well as an erecting system and an eyepiece (6) of the telescopic sight.

17. The telescopic sight of claim 16, wherein the electronics of the laser rangefinder is disposed on boards (27 to 30), the component carrier (2) has a prismatic cross section, and the boards (27 to 30) are disposed on the outside surface of the component carrier (2).

18. The telescopic sight of claim 17, wherein the component carrier (2) has a coaxial duct (3) for receiving the erecting system.

19. The telescopic sight of claim 16, wherein the component carrier (2) has a coaxial duct (3) for receiving the erecting system.

20. The telescopic sight of claim 1, further including a memory, disposed on boards (27–29), provided in which the ballistic data of the weapon and the ammunition are storable, and the device for adjusting the reticle (4) is operable by at least one servomotor (44') which is controllable by evaluation electronics of the laser rangefinder and the ballistic data stored in the memory.

21. A telescopic sight for firearms having a reticle (4), a device for adjusting the reticle on a point of impact and a laser rangefinder for a target with a laser transmitter (18) and a laser receiver (21), a telescopic sight objective (8) being simultaneously an objective for the laser transmitter (18) and the laser receiver (21), a beam path (17) of the laser transmitter (18) and a beam path (20) of the laser receiver (21) being brought into a visual telescopic sight beam path (9) between the objective (8) and the reticle (4), for bringing the beam path (17) of the laser transmitter (18) and the beam path (20) of the laser receiver (21) into the visual telescopic sight beam path (9) a reflection surface (15,16) selectively reflecting the light and passing visible light being disposed in the visual telescopic sight beam path (9), the two reflection surfaces (15,16) being disposed one behind the other in the visual telescopic sight beam path (9), the device for adjusting the reticle (4) on the point of impact having an optical member movable relative to the firearm between the reticle (1) and the light entrance side (38) of the telescopic sight.

* * * * *